March 11, 1924.                1,486,333
E. HANFORD
VEGETABLE AND FRUIT WASHER
Filed Sept. 8, 1922
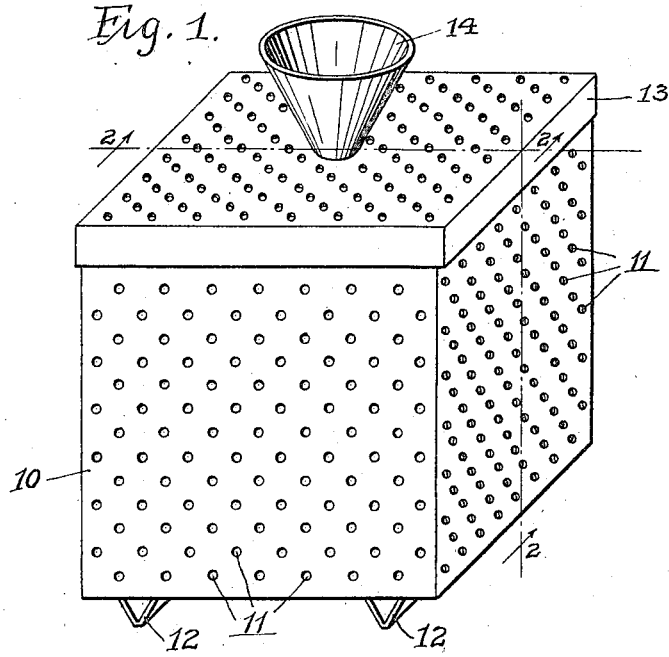
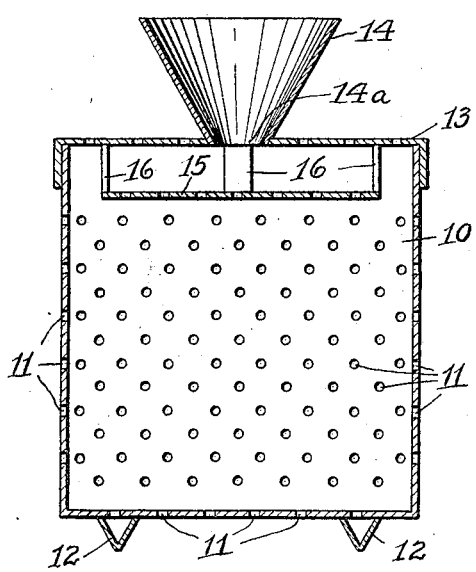
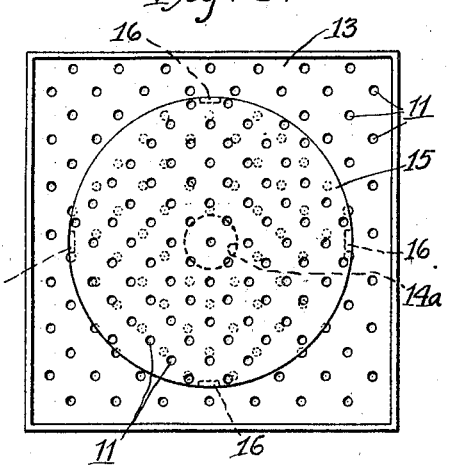
INVENTOR
ELLA HANFORD
BY Albert E. Bree
ATTY.

Patented Mar. 11, 1924.

1,486,333

UNITED STATES PATENT OFFICE.

ELLA HANFORD, OF CHICAGO, ILLINOIS.

VEGETABLE AND FRUIT WASHER.

Application filed September 8, 1922. Serial No. 586,883.

*To all whom it may concern:*

Be it known that I, ELLA HANFORD, a citizen of the United States, residing at Chicago, in the county of Cook and State of Illinois, have invented a new and useful Improvement in Vegetable and Fruit Washers, of which the following is a specification.

My invention relates to an improved form of washing device for fruit and vegetables by which the fruit or vegetable may be placed in the device and water from a tap or faucet may be directed into the device in a solid stream without subjecting the fruit or vegetable to the impact of the solid stream flow, since I provide means in connection with the device for intercepting the solid stream of water and breaking it up into a plurality of small streams which are sprayed over the fruit or vegetable in the device without considerable velocity, thus thoroughly spraying the entire contents of the device with small streams of water having little velocity of flow, with the result that the fruit or vegetables is thoroughly washed and not injured in any way by the washing operation. More specifically, my invention consists of a receptacle having perforated walls, somewhat similar to the well known colander used for domestic purposes, but with this difference, that the device is provided with a perforated cover having an upwardly projecting funnel for receiving the stream of water from the tap or faucet, which cover carries immediately below its inner surface, a spreader disc of perforated sheet material to intercept the solid stream of water delivered into the receptacle by the funnel and break it up into a large number of small streams and thus check the velocity of the solid stream flow and evenly distribute the water through a large number of small streams flowing at low velocity, against all parts of the contents of the receptacle. The construction described, besides being adapted to wash delicate fruit and vegetables without injury, is of advantage for any purpose for which the ordinary colander may be employed, for the reason that no splashing of water results from the use of the device, whereas with ordinary colanders, the water flowing into the colander, or against its contents, in a solid stream is accompanied with the undesirable result of splashing the water for a considerable distance around the colander, frequently wetting surrounding objects in a most undesirable manner, assuming that it is attempted to permit the solid stream of water to flow against the contents of the colander for an appreciable time. With my improved construction on the contrary, since no splashing whatever results from its use, however large a stream of water is delivered to the device from the tap or faucet, it may be left in operation continuously until the contents of the device are thoroughly washed and at the same time the operation of the device prevents crushing or injuring the fruit or vegetable being washed, since the device prevents at all times any considerable impact of water flow against the fruit or vegetable, but instead subjects the fruit or vegetable to a spraying action which is effective in separating the contents of the device sufficiently to permit thorough washing and since all parts of the fruit or vegetable are reached by the spraying action, the result is to remove all the dirt and foreign matter which may be on it.

My invention will best be understood by reference to the accompanying drawings showing a preferred embodiment thereof, in which—

Fig. 1 shows in a perspective view, my improved washing device in assembled relation.

Fig. 2 is a vertical sectional view of the device shown in Fig. 1 taken along the lines 2—2, and Fig. 3 is a bottom view of the cover of the device.

Similar numerals refer to similar parts throughout the several views.

As shown in the drawings, my improved washing device consists of a receptacle 10 having side walls and a bottom of thin sheet material, for example sheet iron or sheet aluminum or other metal adapted to the purpose, said side walls and bottom being perforated with a large number of small holes as indicated at 11. The bottom of the receptacle has secured to it, supporting members 12, 12, preferably of thin sheet metal extending transversely across the bottom to support the bottom of the device above the surface on which it is used, for example a sink, to permit water to flow freely from the device through the perforations 11 in its bottom wall.

The upper open end of the receptacle 10 is adapted to be closed by means of a flanged cover 13, which is perforated and also made from thin sheet material for example iron, aluminum or similar material. The cover 13 has projecting upwardly therefrom a funnel 14, which is located preferably at the central portion thereof and provides a central inlet passage 14ª of considerable diameter, for delivering water from the funnel into the receptacle. A spreader disc 15, which is perforated as indicated, is secured to the inner surface of the cover 13 by suitable posts 16, in substantially parallel relation to the cover 13, and at a sufficient distance therefrom to permit the stream of water delivered through the opening 14ª to be distributed without restriction over the upper surface of the spreader disc. The perforations in the disc 15 afford a large number of paths for the flow of the water downwardly upon the contents of the receptacle 10, the remaining part of the water supplied to the receptacle flowing over the outer edge of the spreader and thus downwardly upon the contents of the receptacle. It will be observed that by this construction, the impact of the relatively large stream of water delivered into the receptacle by the opening 14ª, is entirely broken by the spreader disc 15 and that the streams of water delivered by the spreader disc upon the contents of the receptacle 10, have only substantially the velocity resulting from falling from the spreader disc upon the contents of the receptacle. Furthermore, the water delivered to the contents of the receptacle is in finely sub-divided condition as a result of the perforations in the spreader disc and thus the water is in effect sprayed gently on the contents of the receptacle. The perforations 11 are preferably of a size to prevent the free flow of the water from the receptacle, to the end that a certain amount of water is retained in the receptacle during the operation of the device, thus separating the individual parts of the fruit or vegetable being washed, from each other and permitting the flowing water to reach all parts of the fruit or vegetable to thoroughly clean them. The entire absence of large streams of water flowing against the fruit or vegetable and the entire absence of water streams of any kind striking the fruit or vegetable with appreciable impact, is particularly advantageous in washing delicate fruit, for example red raspberries, and delicate vegetables, for example, spinach, since the crushing of the delicate fruit or delicate leaves of the vegetables is thus entirely prevented. It will also be observed that the impact of the large stream of water delivered to the receptacle, is dissipated entirely within the receptacle and that the spraying action resulting is contained wholly within the receptacle, thus entirely avoiding the possibility of splashing so commonly experienced with annoying results in using the ordinary colander.

It will be understood that the device may be made in any size desired to meet the special requirements of any case and furthermore that the receptacle and its cover may be given any desired shape; also that the funnel carried by the cover may have any desired size and location on the cover to meet the requirements of any special case, all that is necessary in connection with its location being that the water stream delivered by it into the receptacle, shall strike the spreader disc in a manner to completely dissipate the impact of the water stream and spread the water to all parts of the receptacle. The spreader disc may be given any desired shape and should extend nearly to the edges of the cover and I find in practice that a circular shape for the spreader disc, with its central portion preferably in line with the opening 14ª, gives satisfactory results.

While I have shown my invention in the particular embodiment above described it will be understood that I do not limit myself to this exact construction, but that I may employ equivalents known to the art at the time of the filing of this application without departing from the scope of the appended claims.

What I claim is:

1. In combination, a receptacle cover having an admission opening permitting unconfined flow of a solid stream of liquid therethrough, and a spreader plate extending across the path of said stream and located sufficiently below said opening to prevent splash therefrom.

2. In combination, a receptacle cover having an admission opening permitting unconfined flow of a solid stream of liquid therethrough, and a spreader plate carried by the cover and extending across the path of said stream and located sufficiently below said opening to prevent splash therefrom.

3. In combination, a receptacle cover having an admission opening permitting unconfined flow of a solid stream of liquid therethrough, and a perforated spreader plate extending across the path of said stream and located sufficiently below said opening to prevent splash therefrom.

4. In combination, a receptacle cover having an admission opening permitting unconfined flow of a solid stream of liquid therethrough, and a perforated spreader plate carried by the cover and extending across the path of said stream and located sufficiently below said opening to prevent splash therefrom.

5. In combination, a receptacle cover having an admission opening permitting unconfined flow of a solid stream of liquid therethrough, a spreader plate extending across the path of said stream and located sufficiently below said opening to prevent splash therefrom, and a perforated receptacle for receiving said cover.

6. In combination, a receptacle cover having an admission opening permitting unconfined flow of a solid stream of liquid therethrough, a spreader plate carried by the cover and extending across the path of said stream and located sufficiently below said opening to prevent splash therefrom, and a perforated receptacle for receiving said cover.

7. In combination, a receptacle cover having an admission opening permitting unconfined flow of a solid stream of liquid therethrough, a perforated spreader plate extending across the path of said stream and located sufficiently below said opening to prevent splash therefrom, and a perforated receptacle for receiving said cover.

8. In combination, a receptacle cover having an admission opening permitting unconfined flow of a solid stream of liquid therethrough, a perforated spreader plate carried by the cover and extending across the path of said stream and located sufficiently below said opening to prevent splash therefrom, and a perforated receptacle for receiving said cover.

9. In combination, a receptacle cover having an admission opening permitting unconfined flow of a solid stream of liquid therethrough, a spreader plate extending across the path of said stream and located sufficiently below said opening to prevent splash therefrom, and a funnel extending upwardly from said admission opening.

10. In combination, a receptacle cover having an admission opening permitting unconfined flow of a solid stream of liquid therethrough, a spreader plate carried by the cover and extending across the path of said stream and located sufficiently below said opening to prevent splash therefrom, and a funnel extending upwardly from said admission opening.

11. In combination, a receptacle cover having an admission opening permitting unconfined flow of a solid stream of liquid therethrough, a spreader plate extending across the path of said stream and located sufficiently below said opening to prevent splash therefrom, a perforated receptacle for receiving said cover, and a funnel extending upwardly from said admission opening.

12. In combination, a receptacle cover having an admission opening permitting unconfined flow of a solid stream of liquid therethrough, a spreader plate carried by the cover and extending across the path of said stream and located sufficiently below said opening to prevent splash therefrom, a perforated receptacle for receiving said cover, and a funnel extending upwardly from said admission opening.

13. In combination, a receptacle cover having an admission opening permitting unconfined flow of a solid stream of liquid therethrough, a perforated spreader plate carried by the cover and extending across the path of said stream and located sufficiently below said opening to prevent splash therefrom, and a funnel extending upwardly from said admission opening.

14. In combination, a receptacle cover having an admission opening permitting unconfined flow of a solid stream of liquid therethrough, a perforated spreader plate carried by the cover and extending across the path of said stream and located sufficently below said opening to prevent splash therefrom, a perforated receptacle for receiving said cover, and a funnel extending upwardly from said admission opening.

In witness whereof, I hereunto subscribe my name this 6th day of September, A. D. 1922.

ELLA HANFORD.